United States Patent
Kim et al.

(10) Patent No.: US 8,787,909 B2
(45) Date of Patent: Jul. 22, 2014

(54) SERVER FOR CONTROL PLANE AT MOBILE COMMUNICATION NETWORK AND METHOD FOR CONTROLLING LOCAL IP ACCESS SERVICE

(75) Inventors: Taehyeon Kim, Gyeonggi-Do (KR); Laeyoung Kim, Gyeonggi-Do (KR); Hyunsook Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 652 days.

(21) Appl. No.: 12/860,240

(22) Filed: Aug. 20, 2010

(65) Prior Publication Data

US 2011/0045826 A1  Feb. 24, 2011

Related U.S. Application Data

(60) Provisional application No. 61/235,691, filed on Aug. 21, 2009, provisional application No. 61/236,545, filed on Aug. 25, 2009, provisional application No. 61/328,159, filed on Apr. 26, 2010, provisional application No. 61/330,389, filed on May 2, 2010, provisional application No. 61/330,854, filed on May 3, 2010.

(30) Foreign Application Priority Data

Jul. 8, 2010 (KR) ........................ 10-2010-0066020

(51) Int. Cl.
*H04W 4/00* (2009.01)
*H04W 40/00* (2009.01)
*H04M 3/00* (2006.01)

(52) U.S. Cl.
USPC ............ 455/435.2; 455/426.1; 455/445; 455/449; 455/560; 370/328; 370/338

(58) Field of Classification Search
USPC ........ 455/411, 426.1, 435.1–435.3, 445, 449, 455/450–452.2, 525, 560
See application file for complete search history.

(56) References Cited

U.S. PATENT DOCUMENTS

2005/0026597 A1* 2/2005 Kim et al. ................. 455/412.1
2007/0243872 A1 10/2007 Gallagher et al.
(Continued)

FOREIGN PATENT DOCUMENTS

EP 1983771 A1 10/2008
KR 10-2010-0119349 A 11/2010
(Continued)

*Primary Examiner* — Matthew Sams
(74) *Attorney, Agent, or Firm* — Birch, Stewart, Kolasch & Birch, LLP

(57) ABSTRACT

Disclosed is a method of controlling a LIPA (Local IP Access) service in a server taking charge of the control plane within a mobile communication network. The method of controlling a LIPA service may include receiving an initial message from Home (e)NodeB. The initial message may include at least one of LIPA related information and capability information. The LIPA related information may include at least one of APN (Access Point Name) for LIPA and information for a local gateway, and the capability information may include an indicator indicating whether the Home (e)NodeB supports a LIPA function, and the initial message may include an access request message by a terminal. The method of controlling a LIPA service may further include determining whether the terminal can use a LIPA service at the Home (e)NodeB by considering at least one of the LIPA related information within the initial message, the capability information within the initial message, and subscriber information of the terminal, upon receiving the initial message; storing a result of the determination; generating an access accept message including an indicator indicating whether the terminal can use a LIPA service at the Home (e)NodeB; and transmitting an initial setup message including the generated access accept message to the Home (e)NodeB.

16 Claims, 9 Drawing Sheets

(56) References Cited

U.S. PATENT DOCUMENTS

| | | |
|---|---|---|
| 2008/0076393 A1 | 3/2008 | Khetawat et al. |
| 2008/0207170 A1* | 8/2008 | Khetawat et al. ............ 455/411 |
| 2008/0261563 A1 | 10/2008 | Drevon et al. |
| 2009/0073919 A1* | 3/2009 | Chen ............................ 370/328 |
| 2009/0232019 A1* | 9/2009 | Gupta et al. .................. 370/252 |
| 2010/0128708 A1* | 5/2010 | Liu et al. ...................... 370/338 |
| 2010/0128709 A1* | 5/2010 | Liu et al. ...................... 370/338 |
| 2010/0189084 A1* | 7/2010 | Chen et al. ................... 370/338 |
| 2010/0227627 A1* | 9/2010 | Ishii et al. .................. 455/456.2 |
| 2011/0038318 A1* | 2/2011 | Parsons et al. ............... 370/328 |
| 2012/0039304 A1* | 2/2012 | Kim et al. ..................... 370/332 |
| 2012/0076047 A1* | 3/2012 | Turanyi et al. ............... 370/254 |
| 2012/0214445 A1* | 8/2012 | Stojanovski et al. ......... 455/411 |

FOREIGN PATENT DOCUMENTS

| | | |
|---|---|---|
| KR | 10-2010-0119477 A | 11/2010 |
| WO | WO 2007/073773 A1 | 7/2007 |
| WO | WO 2009/028209 A1 | 3/2009 |

* cited by examiner

SERVER FOR CONTROL PLANE AT MOBILE COMMUNICATION NETWORK AND METHOD FOR CONTROLLING LOCAL IP ACCESS SERVICE

RELATED APPLICATION

Pursuant to 35 U.S.C. §119(a), this application claims the benefit of U.S. Provisional Applications No. 61/235,691 filed on Aug. 21, 2009, No. 61/236,545 filed on Aug. 25, 2009, No. 61/328,159 filed on Apr. 26, 2010, No. 61/330,389 filed on May 2, 2010 and No. 61/330,854 filed on May 3, 2010 and the benefit of earlier filing date and right of priority to Korean Application No. 10-2010-0066020, filed on Jul. 8, 2010, the contents of which is incorporated by reference herein in its entirety

TECHNICAL FIELD

The present disclosure relates to a mobile communication system.

BACKGROUND ART

In order to cope with various forums and new technologies related to the 4th generation mobile communications, the 3rd Generation Partnership Project (3GPP) who enacts the technical standards of 3G mobile communication systems has proceeded with studies on the Long Term Evolution/System Architecture Evolution (LTE/SAE) technologies since the end of 2004 as a part of the effort to optimize and enhance the performance of 3GPP technologies.

The SAE led by 3GPP SA WG2 is a study on network technologies for the purpose of determining a network structure together with the LTE work of 3GPP TSG RAN and supporting mobility between heterogeneous networks. In recent years, the SAE has been considered one of the latest important standard issues in 3GPP. It is a work to develop a system supporting various radio access technologies on the basis of 3GPP IP systems, and has been progressed to aim at an optimized packet based system that minimizes a transmission delay with enhanced transmission capability.

A high-level reference model defined by 3GPP SA WG2 includes a non-roaming case and roaming cases having various scenarios, and the detailed description thereof is given in 3GPP standard documents TS 23.401 and TS 23.402. In FIG. 1, there is illustrated a structural diagram of a network in which the model is schematically reconfigured.

FIG. 1 is a structural diagram illustrating an evolved mobile communication network.

One of the distinctive characteristics of the network structure of FIG. 1 is that it is based on a 2-tier model having an eNode B of the Evolved UTRAN and a gateway of the core network. The eNode B has a similar function, although not exactly the same, to the eNode B and RNC of the existing UMTS system, and the gateway has a function similar to the SGSN/GGSN of the existing system.

Another distinctive characteristic is that the control plane and the user plane between the access system and the core network are exchanged with different interfaces. While one Iu interface exists between the RNC and the SGSN in the existing UMTS system, two separate interlaces, i.e., S1-MME and S1-U, are used in the Evolved Packet Core (SAE) system since the Mobility Management Entity (MME) 51 taking charge of the processing of a control signal is structured to be separated from the gateway (GW). For the GW, there are two types of gateways, a serving gateway (hereinafter, 'S-GW') 52 and a packet data network gateway (hereinafter, 'PDN-GW' or 'P-GW') 53.

FIG. 2 is a view illustrating a relation between (e)NodeB and Home (e)NodeB.

In the 3rd or 4th generation mobile communication systems, attempts continue to increase their cell capacity in order to support high-capacity and bi-directional services such as multimedia contents, streaming, and the like.

In other words, with the development of communication and widespread multimedia technologies, various high-capacity transmission technologies are required, and accordingly, a method of allocating more frequency resources is used to increase radio capacity, but there is a limit to allocate more frequency resources to a plurality of users with restricted frequency resources.

In order to increase cell capacity, there has been an approach in which high frequency bandwidth is used and the cell diameter is reduced. If a cell having a small cell radius such as a pico cell is applied, it is possible to use a higher bandwidth than the frequency that has been used in the existing cellular system, thereby providing an advantage capable of transmitting more information. However, more base stations should be installed in the same area, thereby having a disadvantage of high investment cost.

In recent years, a femto base station such as Home (e)NodeB 30 has been proposed among the approaches for increasing cell capacity using such a small cell.

Studies on the Home (e)NodeB 30 have been started by 3GPP Home (e)NodeB WG3, and also in recent years, actively proceeded by SA WG.

The (e)NodeB 20 illustrated in FIG. 2 corresponds to a macro base station, and the Home (e)NodeB 30 illustrated FIG. 2 may be a femto base station. This specification will be described based on the terms of 3GPP, and the term (e)NodeB is used when referring to both NodeB and eNodeB. Also, the term Home (e)NodeB is used when referring to both Home NodeB and Home eNodeB.

The interface illustrated in a dotted line denotes the transmission of control signals between the (e)NodeB 20 or Home (e)NodeB 30 and the MME 51. Also, the interface illustrated in a solid line denotes the transmission of data of the user plane.

DISCLOSURE OF THE INVENTION

In the foregoing related art, although Home (e)NodeB, namely, a femto base station, is provided indoors, for example, at home or in company, the UE cannot access a local network at home or in company through the Home (e)NodeB.

In other words, though the user desires to perform services provided from the local network at home or in company from the Home (e)NodeB using the UE, for instance, printer services and digital living network alliance (DLNA) services, suitable technologies have not been presented until now.

On the other hand, the local network at home or in company is connected to an external Internet network, and the mobile communication operator' network 60 is also connected to an external Internet network, and thus the UE's request may be transferred to the mobile communication operator's network 60 through a S-GW 52 and a P-GW 53, and the external Internet network, and finally transferred to the local network at home or in company. However, if the UE is located at the home or in the company, such a scheme may be very ineffective.

Accordingly, an objective of the present invention is to solve the foregoing problems. In other words, one aspect of the present invention is to allow the UE to access a node within a local network (home network at home or office network in company) through Home (e)NodeB, namely, a femto base station, thereby transmitting or receiving data. In addition, another aspect of the present invention is to provide an effective management method in an operator network for allowing only a permitted UE to request a local network session, thereby preventing the waste of unnecessary radio resources.

In order to accomplish the foregoing objective, according to the present invention, there is provided a method of controlling a LIPA (Local IP Access) service in a server taking charge of the control plane within a mobile communication network. The method of controlling a LIPA service may include receiving an initial message from Home (e)NodeB. The initial message may include at least one of LIPA related information and capability information. The LIPA related information may include at least one of APN (Access Point Name) for LIPA and information for a local gateway, and the capability information may include an indicator indicating whether the Home (e)NodeB supports a LIPA function, and the initial message may include an access request message by a terminal. The method of controlling a LIPA service may further include determining whether the terminal can use a LIPA service at the Home (e)NodeB by considering at least one of the LIPA related information within the initial message, the capability information within the initial message, and subscriber information of the terminal, upon receiving the initial message; storing a result of the determination; generating an access accept message including an indicator indicating whether the terminal can use a LIPA service at the Home (e)NodeB; and transmitting an initial setup message including the generated access accept message to the Home (e)NodeB. When the initial setup message is received by the Home (e)NodeB, the Home (e)NodeB extracts the access accept message within the initial setup message, and then encapsulates the extracted access accept message to transmit to the terminal. Then, the terminal may check the access accept message to determine whether the LIPA service can be used at the Home (e)NodeB, and request a LIPA session based on the determination. Then, the server may generate the requested LIPA session, and transfer a result of the generated LIPA session to the terminal through the Home (e)NodeB.

In order to accomplish the foregoing objective, according to the present invention, there is provided a server of taking charge of a LIPA (Local IP Access) service within a mobile communication network. The server may include a receiver configured to receive an initial message including LIPA related information and capability information from Home (e)NodeB. The LIPA related information may include at least one of APN (Access Point Name) for LIPA and information for a local gateway, and the capability information may include an indicator indicating whether the Home (e)NodeB supports a LIPA function, and the initial message may include an access request message by a terminal.

The server may further include a controller configured to control to determine whether the terminal can use a LIPA service at the Home (e)NodeB by considering at least one of the LIPA related information within the initial message, the capability information within the initial message, and subscriber information of the terminal, in response to the initial message, and store a result of the determination; and a transmitter configured to encapsulate an access accept message comprising an indicator indicating whether the terminal can use a LIPA service at the Home (e)NodeB in an initial setup message to transmit to the Home (e)NodeB.

The initial message may be an Initial UE message. Furthermore, the access request message may correspond to any one of an attach request message, a TAU (Tracking Area Update) request message, a RAU request message, and a handover request message.

The access accept message may be any one of an Attach Accept message, a TAU Accept message, and a RAU Accept message. Furthermore, the initial setup message may be an Initial context Setup message.

The initial message further may include CSG related information.

The CSG related information may further include at least one of a CSG ID and an CSG access operation mode parameter of the Home (e)NodeB.

The indicator indicating whether the Home (e)NodeB supports a LIPA function may be LIPA_capability_indicator, and the indicator indicating whether the terminal can use a LIPA service at the Home (e)NodeB may be LIPA_Available_indicator.

At the time of the determination, it may be further considered whether the terminal is subscribed to a LIPA service based on the subscriber information.

At the time of the determination, it may be further considered whether the terminal has a CSG membership to the Home (e)NodeB.

The result of the determination may be stored within a UE context and a MM/EPC Bearer Context.

The access accept message may further include APN for a LIPA service.

The terminal may check an indicator indicating whether a LIPA service can be used within the access accept message, and determine whether the LIPA service can be used based on the indicator.

A request of a LIPA session by the terminal may be accomplished by transmitting a PDN connectivity request message, for instance, PDN Connectivity Request message. The PDN connectivity request message may further include an APN for LIPA. Upon receiving a request of the LIPA session, for instance, PDN connectivity request message, the server may check whether the APN for LIPA is included therein. If the APN for LIPA is included therein, the server may create a session for LIPA.

According to the present invention, the UE is allowed to be directly connected to a local network such as a home network without passing through a mobile communication network over the Home (e)NodeB. In other words, according to the present invention, it is allowed to be connected a local network such a home network through a cellular technology.

In addition, according to the present invention, the UE may attempt an access only when LIPA is enabled, thereby reducing the waste of unnecessary radio resources.

MODES FOR CARRYING OUT THE PREFERRED EMBODIMENTS

Figure 1:
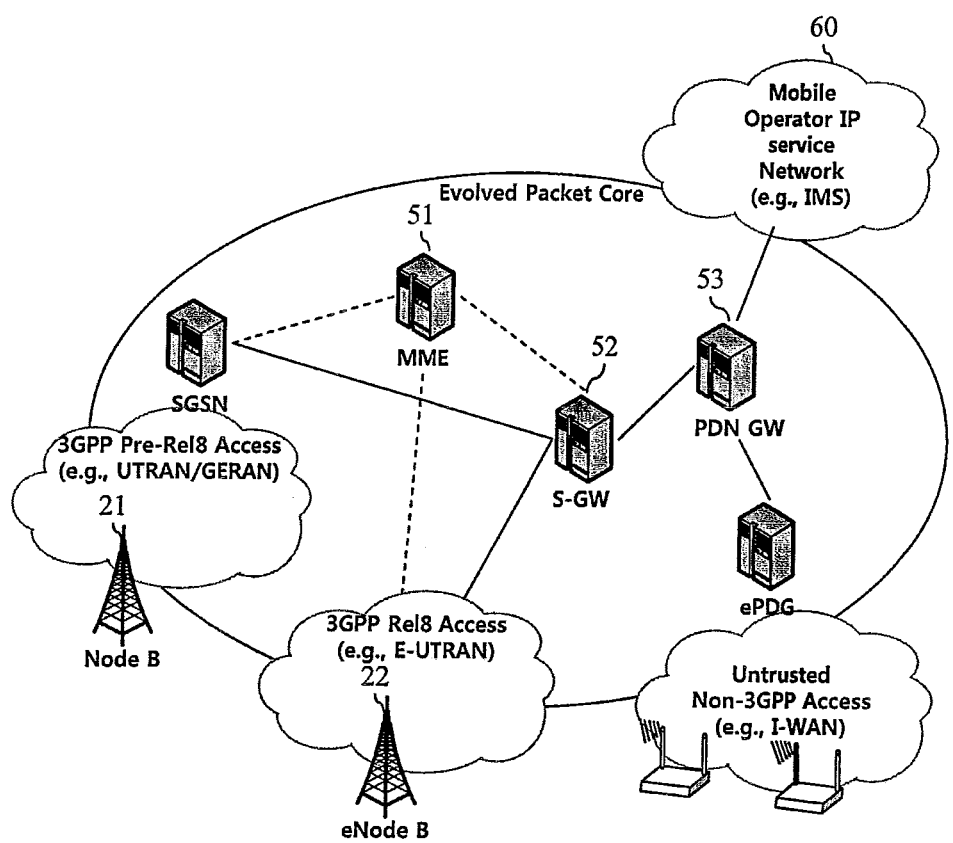
FIG. 1 is a structural diagram illustrating an evolved mobile communication network.
Figure 2:
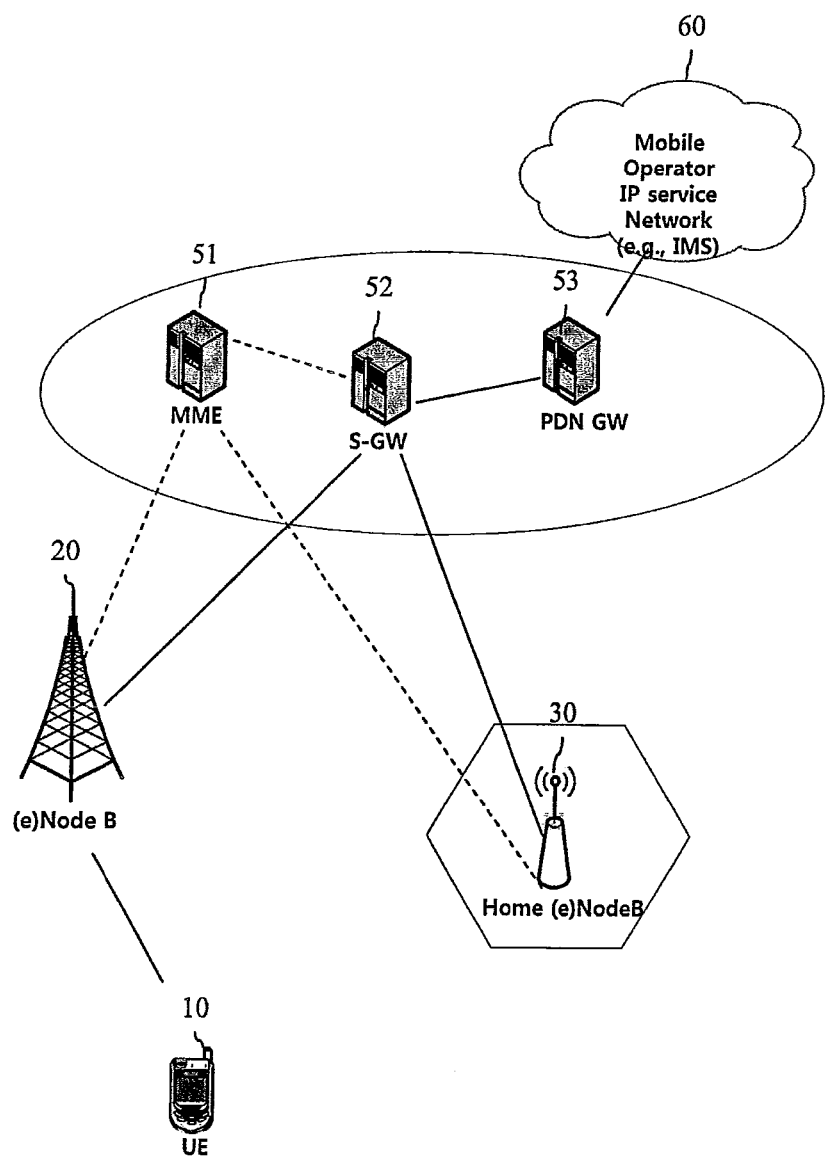
FIG. 2 is a view illustrating a relation between (e)NodeB and Home (e)NodeB.

The present invention will be described on the basis of a universal mobile telecommunication system (UMTS) and an evolved packet core (EPC). However, the present invention is not limited to such communication systems, and it may be also applicable to all kinds of communication systems and methods to which the technical spirit of the present invention is applied.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms used herein including an ordinal number such as first, second, etc. can be used to describe various elements, but the elements should not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

Hereinafter, the term "terminal" is used, but the terminal may be also called a user equipment (UE), a mobile equipment (ME), and a mobile station (MS). Furthermore, the terminal may be portable equipment such as a portable phone, a PDA, a smart phone, and a notebook, or non-portable equipment such as a PC, and a vehicle-loaded device.

Furthermore, the term "Home (e)NodeB" is used below, but the Home (e)NodeB may be called a femto base station, a Home NodeB, and a Home eNodeB.

Definition of Terms

Hereinafter, the terms used in this specification will be briefly defined prior to describing with reference to the drawings.

UMTS: It is an abbreviation of Universal Mobile Telecommunication System and denotes the 3rd mobile communication network.

EPS: It is an abbreviation of Evolved Packet System, and denotes a core network supporting a Long Term Evolution (LTE) network. It is a network in the form of an evolved UMTS.

APN (Access Point Name): The name of an access point previously defined within a network to find a P-GW when a requested service is passed through the P-GW to access a network. The APN is provided to the UE, and the UE determines a suitable PDN-GW for data transmission and reception based on the APN.

Access Control: A control procedure for allowing the UE to be used at an access system such as Home (e)NodeB, or to be moved to another access system.

TEID (Tunnel Endpoint Identifier): An end point ID of a tunnel configured between nodes within a network. It is configured for each section in the unit of each bearer of the UE.

NodeB: It is installed outdoors as a base station of the UMTS network, and the size of the cell coverage may correspond to a macro cell.

eNodeB: It is installed outdoors as a base station of the Evolved Packet Core (EPC) network, and the size of the cell coverage corresponds to a macro cell.

(e)NodeB: It is a term indicating NodeB and eNodeB.

Home NodeB: It is installed indoors as a base station of the UMTS network, and the size of the cell coverage corresponds to a femto cell.

Home eNodeB: It is installed indoors as a base station of the EPS network, and the size of the cell coverage corresponds to a femto cell.

Home (e)NodeB: It is a term indicating Home NodeB and Home eNodeB.

Home (e)NodeB Gateway: It is connected to at least one Home (e)NodeB as a gateway performing a role of interlacing with a core network.

Home (e)NodeB Subsystem: It is a form of combining a Home (e)NodeB with a Home (e)NodeB Gateway into a set to manage a radio network. Both the Home (e)NodeB subsystem and the Home (e)NodeB perform a role of managing a radio network to link with a core network, and thus considered as an aggregate form. Accordingly, the terms "Home (e)NodeB" and "Home (e)NodeB subsystem" are interchangeably used below.

Closed Subscriber Group (CSG): It denotes a group having at least one Home (e)NodeB. The Home (e)NodeBs belonging to the CSG have a same CSG ID. Each user receives a license for each CSG.

Closed Access Mode: It denotes a mode in which a Home (e)NodeB is operated as a CSG cell. It operates with a method of allowing an access only to a user terminal allowed for the relevant cell. In other words, a terminal having an authority for the particular CSG IDs supported by a Home (e)NodeB is only accessible.

Open Access Mode: It denotes a mode in which a Home (e)NodeB is operated with a method similar to a normal cell (non-CSG cell) without the concept of CSG. In other words, it is operated like a normal (e)NodeB.

Hybrid Access Mode: It denotes a mode in which a Home (e)NodeB is operated as a CSG cell, but its access is also allowed to an non-CSG subscriber. The access is allowed for a user terminal having a particular CSG ID that can be supported by the relevant cell to provide a Home (e)NodeB service, and it is operated with a method in which even a terminal having no CSG authority is allowed to access.

Local IP Access (LIPA): Technology for connecting Home (e)NodeB to a local network (home network at home or office network in a company), and assigning an IP address to the UE within the Home (e)NodeB, thereby allowing the UE to be connected to the local network (home network at home or office network in a company) through the Home (e)NodeB.

Local Gateway: It denotes a gateway for enabling LIPA through the Home (e)NodeB. The local gateway creates a bearer between the Home (e)NodeB and the local network, and allows data transmission through the created bearer.

Description for the Concept of Schemes Proposed by this Specification

According to this specification, there is presented a technology of transmitting and/or receiving data to and/or from a path through nodes within a local network (home network at home or office network in office) over a mobile communication network such as 3GPP Universal Mobile Telecommunication System (UMTS)/Evolved Packet System (EPS), namely, LIPA (Local IP Access). Here, the LIPA (Local IP Access) is a concept of accessing a home network at home or a local network (LAN) in office using Home (e)NodeB to use a service over a local IP network. The key point is that control signals for control are transmitted or received through a core network whereas general data is transmitted or received over a local network at Home (e)NodeB.

Furthermore, according to this specification, there is presented an architecture for implementing the LIPA technology. In addition, according to this specification, there is proposed a method for configuring a Local IP PDN Connectivity (session) required to use a local network through Home (e)NodeB.

Hereinafter, it will be described in detail with reference to the accompanying drawings.

Figure 3:
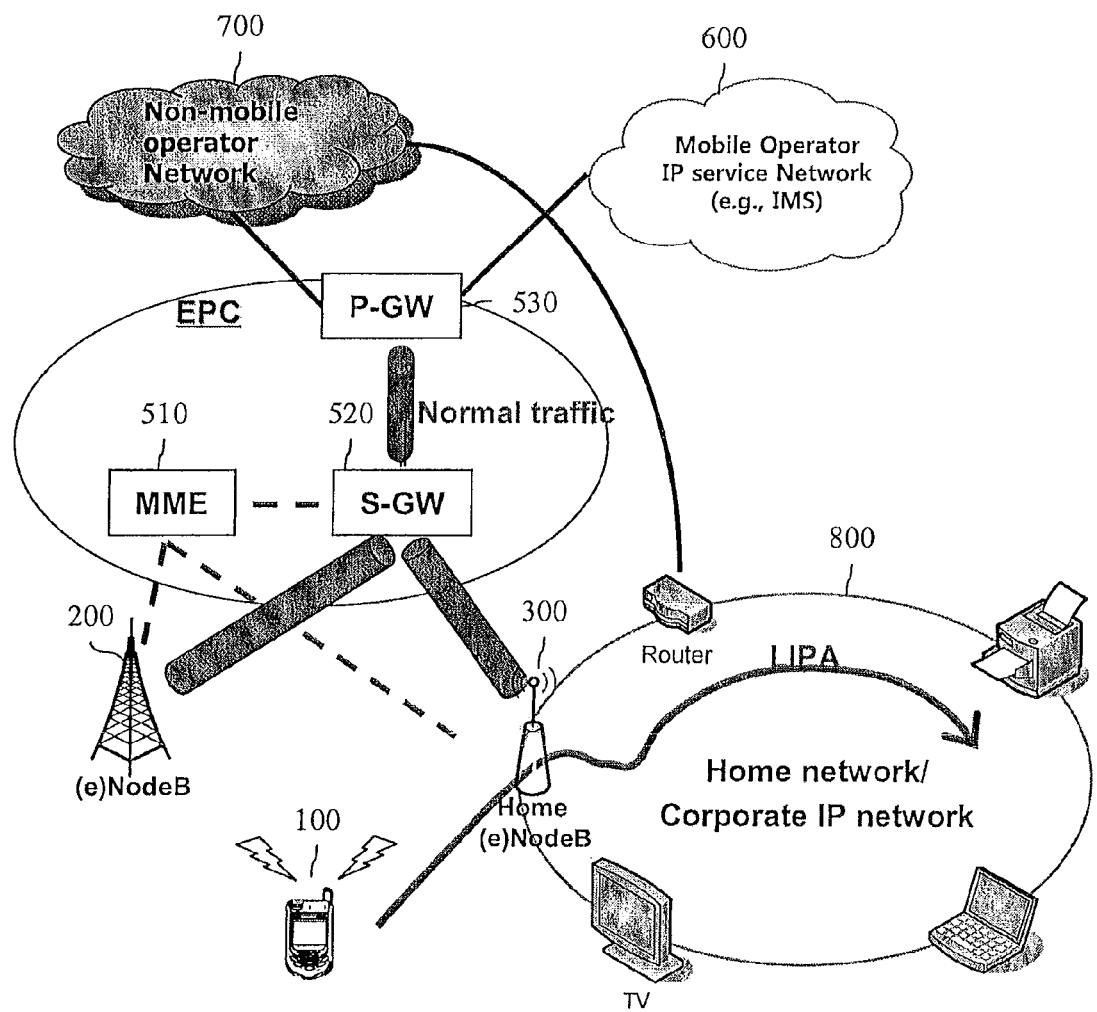
FIG. 3 is a view illustrating the concept of LIPA (Local IP Access)

FIG. 3 is a view illustrating the concept of LIPA (Local IP Access).

As illustrated in FIG. 3, if the UE 100 receives access permission to the Home (e)NodeB, then the UE 100 may access the Home (e)NodeB 300 to use a service through a mobile communication network. Also, the UE 100 may access a local network 800 at home or in company through the Home (e)NodeB 300 using the LIPA technology presented according to the present invention.

Up to this point, it has been described a concept in which the UE 100 accesses a local network at home or in office through the Home (e)NodeB 300.

Hereinafter, an architecture for implementing the foregoing concept will be described.

Figure 4:
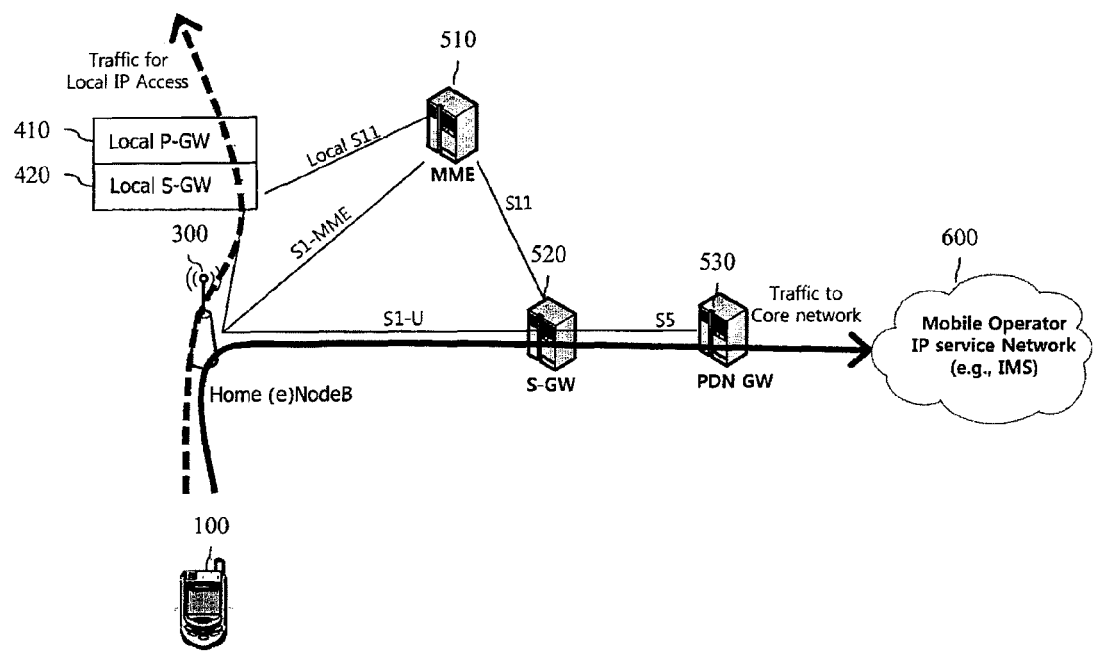
FIG. 4 is an exemplary view illustrating an architecture presented according to the present invention based on EPC.

FIG. 4 is an exemplary view illustrating an architecture presented according to the present invention based on EPC.

Referring to FIG. 4, the UE 100 may perform general services through a session illustrated in a solid line in FIG. 4, namely, a session (PDN Connection or bearer) set through the Home (e)NodeB 300, S-GW 520, P-GW 530, and a mobile communication operator's network 600, or perform services provided to a local network 800 through a session illustrated in a dotted line in FIG. 4.

To allow the UE to use the local network 800 at home or in company through the Home (e)NodeB 300, a new session should be created as a case of using a service through the mobile communication network.

In order to support the LIPA, in case of UMTS, SGSN/GGSN, and EPS, the function of S-GW (Serving Gateway)/P-GW (PDN Gateway) is additionally required in a local network in which the Home (e)NodeB 300 is used.

In other words, a local SGSN and a local GGSN may additionally exist in UMTS, and a local serving gateway (referred to as "local S-GW") and a local PDN gateway (referred to as "local P-GW") may additionally exist in EPC.

The local SGSN, the local GGSN, the local serving gateway, and the local PDN gateway can create a session through a path between the Home (e)NodeB 300 and the local network 800 at home or in office, and thus it may be distinguished from the P-GW 530 or GGSN creating a session through a path to a mobile communication operator's network 600.

In FIG. 4, a local PDN gateway (local P-GW) 410 and a local serving gateway (local S-GW) 420 are exemplarily illustrated based on EPC.

The local PDN gateway 410 and the local serving gateway 420 are located between the Home (e)NodeB 300 and the local network 800, and they are gateways for enabling LIPA through the Home (e)NodeB 300. The local PDN gateway 410 and the local serving gateway 420 are allowed to create a session through a path between the Home (e)NodeB and the local network 800, and to enable data transmission through the created session.

To create a session based on the structure, an address and TEID should be known to each other between the Home (e)NodeB 300 and the local serving gateway 420. For this purpose, the UE 100 requests LIPA PDN connectivity to the MME 510. At this time, APN for LIPA may be transferred to the MME 510. Also, a LIPA indicator may be additionally transferred. On the other hand, the Home (e)NodeB 300 should transfer an address of the local serving gateway 420 to the MME 510. The local serving gateway 420 is provided for each LIPA-enabled network, and thus there exist a large number of local serving gateways. Accordingly, the MME 510 may have difficulty in storing or managing them all, and therefore it may be effective to transmit to the relevant local network when required. For a method of transferring to the MME 510, it may be transferred when configuring a S1-AP message between the Home (e)NodeB 300 and the MME 510 or a control session between the Home (e)NodeB 300 and the MME 510. On the other hand, the MME 510 makes a new session setup request to the local serving gateway (local S-GW) 420 to configure a LIPA session. At this time, the local serving gateway 420 should know an address of the local PDN gateway 410. It may be possible by various methods to know the address of the local PDN gateway 410. In other words, it may be transferred together when transferring an address of the local serving gateway 420 as described above, or the local serving gateway 420 may directly find it with no transfer. Since the local PDN gateway 410 and the local serving gateway 420 provide a limited function in a local area, it may be possible with an exceptional method differently from the core network. The local serving gateway 420 forms a session using an address of the local PDN gateway, and as a result, the local PDN gateway 410 transfers the TEID used for a LIPA session to the local serving gateway 420 to form a session. The local serving gateway 420 transfers its own address and TEID to the MME 510, and the MME 510 transfers the address and TEID of the local serving gateway 420 to the Home (e)NodeB 300. The Home (e)NodeB 300 forms a tunnel with the local serving gateway 420 using the information and configures a session of the radio section to create a final LIPA session.

As illustrated in FIG. 4, general traffic of the UE 100 is forwarded to the mobile communication operator's network 600 by passing through the S-GW 520 and P-GW 530 through the Home (e)NodeB 300.

However, traffic forwarded to the local network 800 at home or in company is forwarded to the local serving gateway 420 and the local PDN gateway 410 through the Home (e)NodeB 300.

The local PDN gateway 410 may include part of all of the functions of PDN-GW for an EPC system, or may include part of all of the functions of GGSN (Gateway GPRS Support Node) for UMTS.

As described above, in FIG. 4, there is proposed the local PDN gateway 410 and the local serving gateway 420 for LIPA. At this time, according to EPC in the 3GPP standard, the local serving gateway (local S-GW) can perform only a simple function without violating the assumption that the UE 100 should receive a service from only one S-GW. As a result, the problem of FIG. 4 lies in that the S-GW 520 and the local serving gateway (local S-GW) 420 should be operated within an operator's network, but their operation is managed at the MME 510. In other words, for the method of FIG. 4, the function of operating the local serving gateway (local S-GW) 420 should be added to the MME 510 according to circumstances, and for this purpose a new interface between the MME and the local serving gateway (local S-GW) 420 should be made and used, thereby requiring additional functional modification.

Figure 5:
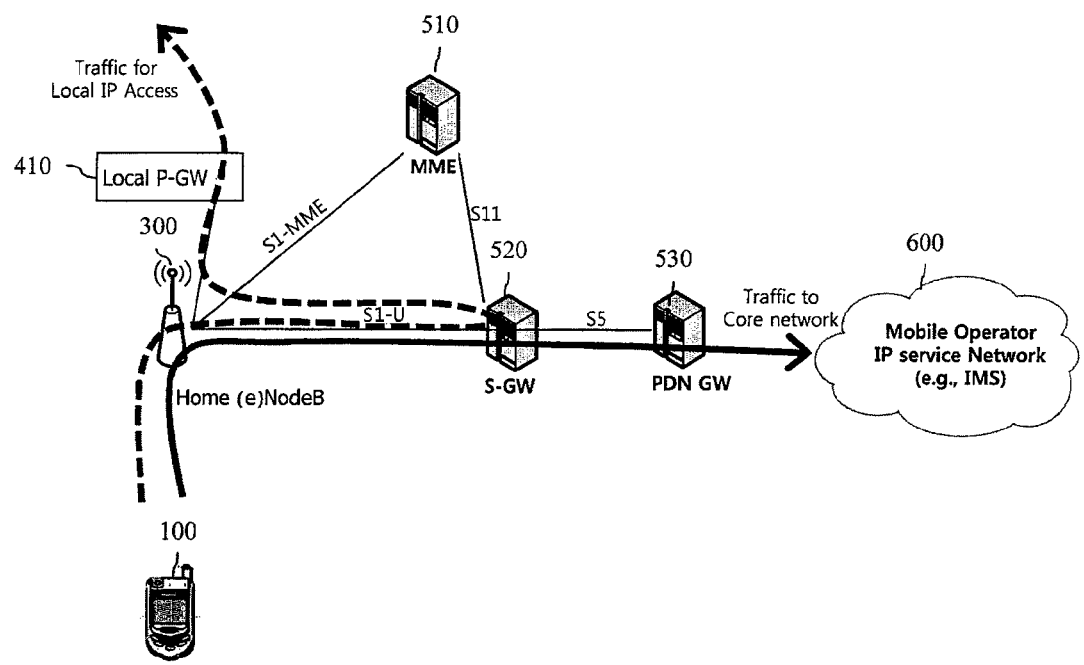
FIG. 5 is another exemplary view illustrating an architecture presented according to the present invention based on EPC.

FIG. 5 is another exemplary view illustrating an architecture for LIPA presented according to the present invention based on EPC.

Contrary to FIG. 4, only a local PDN gateway (local P-GW) 410 is added thereto in FIG. 5. Accordingly, as illustrated in a dotted line, a session (PDN connectivity or bearer) forwarded to the local network 800 is passed through the Home (e)NodeB 300 and the S-GW 520 within the core network, and then set through local PDN gateway (local P-GW) 410.

The architecture illustrated in FIG. 5 complies with the EPC standard in the 3GPP standard in that the UE 100 should receive a service from only one S-GW, but it may be ineffective because traffic to a local network should be also passed through the S-GW 520 in a core network. To overcome such ineffectiveness, a direct tunnel may be set between the Home (e)NodeB and the local PDN gateway 410, thereby allowing traffic not to be actually passed through the S-GW 520 of the core network. In other words, the S-GW 520 is used for paging or initial transmission, and thereafter actual transmission is carried out by using a direct tunnel between the Home (e)NodeB 300 and the local PDN gateway 410.

To create a session based on such a structure, an address and TEID should be known to each other between the Home (e)NodeB 300 and the local PDN gateway 410. For this purpose, the UE 100 requests LIPA PDN connectivity to the MME 510 through the Home (e)NodeB. At this time, APN for LIPA may be transferred to the MME 510. Also, a LIPA indicator may be additionally transferred. On the other hand, when the Home (e)NodeB transfers the request to the MME 510, the Home (e)NodeB may transfer an address of the MME 510 together. For a method of transferring to the MME 510, it may be transferred when configuring a S1-AP message between the Home (e)NodeB 300 and the MME 510 or a control session between the Home (e)NodeB 300 and the MME 510. On the other hand, the MME 510 makes a new session setup request to the S-GW 520 to configure a LIPA session, and at this time the address of the local PDN gateway 410 may be transferred. The S-GW 520 forms a session using the transferred address of the local PDN gateway 410, and as a result, the local PDN gateway 410 transfers the TEID used for a LIPA session to the S-GW 520. The S-GW 520 transfers the result to the MME 510, and the MME 510 transfers the address and TEID of the local PDN gateway 410 that has been transferred to the Home (e)NodeB 300. The Home (e)NodeB 300 forms a direct tunnel with the local PDN gateway 410 using the information and configures a session of the radio section to create a final LIPA session.

In case of the present method, a new interface should be made between the S-GW 520 and the local PDN gateway 410, thereby requiring functional modification to the S-GW. However, the functional modification may be possible with a method of selectively changing only data to the existing function. It may be a simple modification compared to the level required in FIG. 4.

Though LIPA can be supported based on FIGS. 4 and 5, both the two methods are provided to support the function of accessing a local network in a cellular network, and as a result it may be required functional modification in the existing MME 510. The advantage commonly obtained in the foregoing two methods is to simplify a process of selecting the P-GW 410. In case of the related art, it should undergo the process of selecting the P-GW 410 based on the transferred APN. It obtains an address of the P-GW 410 through the help of another server or network. In case of LIPA, it may be used an address of the local PDN gateway 410 transferred to the Home (e)NodeB 300 and the local serving gateway (local S-GW) 420. Actually, there exist several tens of P-GWs 530 in an operator network for each operator although it varies depending on the number of holding devices, but the number of user's local networks is almost equal to the number of Home (e)NodeBs 300. Thus, it is very difficult to manage the address of all local PDN gateways 410 in the operator network. As a result, it may be suitable to use a method through the Home (e)NodeB 300.

Up to this point, referring to FIGS. 4 and 5, the architectures for LIPA have been described.

However, if a new procedure is not presented together with the foregoing architecture, then the UE 100 attempts to perform a LIPA access at its discretion, and at this time the access attempt of the UE 100 may cause unnecessary signaling when Home (e)NodeB 300 does not support the LIPA or the LIPA is not supported by the subscriber information of the UE 100. Accordingly, the access attempt of the UE 100 results in failure since the UE 100 does not know the cause of the failure and continues to repeatedly perform access attempts. As a result, it may cause a considerable amount of transmission and reception.

Therefore, hereinafter, a new control procedure for LIPA will be presented based on the foregoing architecture.

Hereinafter, referring to FIGS. 6 and 7, a specific control procedure for LIPA according to a first embodiment will be described.

To promote the understanding of the detailed control procedure it will be briefly described as follows.

First, the local network at home or in company may cause security problem when accessed by all UEs, and accordingly it may be premised that the UE is subscribed to CSG.

Furthermore, a service provided through the local network at home or in company, for instance, a DLNA (Digital Living Network Alliance) service, a service for controlling home appliances or the like, may be different from an access service provided through the mobile communication network 600, and thus APN (Access Point Name) indicating the name of an access point provided in the LIPA may be different. Therefore, the UE 100 should know the predetermined APN to use LIPA. In other words, the UE 100 should know the predefined APN to perform LIPA to the local network 800 at home or in company. At this time, the APN for LIPA may be different for each Home (e)NodeB, or all Home (e)NodeBs within an operator's network may use the same APN. In case where the APN for LIPA is different for each Home (e)NodeB, each Home (e)NodeB 300 may broadcast the relevant APN for LIPA, or if the Home (e)NodeB 300 transfers it to an entity within the core network, for instance, SGSN/MME, when the UE 100 is attached to each Home (e)NodeB 300, or performs TAU, RAU, or handover, then the core network entity may transfer it to the Home (e)NodeB 300 in the form of a NAS message. In case where all Home (e)NodeBs use the same APN within an operator's network, the APN for LIPA may be transferred at the time of registration or in the form of OTA (over the air) or message in advance in the core network.

On the other hand, when the UE 100 is attached to a core network through Home (e)NodeB 300, the Home (e)NodeB 300 transfers information related to the Home (e)NodeB 300 and CSG related information to MME 510 (or SGSN in case of UMTS) taking charge of control functions.

The information related to Home (e)NodeB 300 may include LIPA related information and capability information of Home (e)NodeB. The LIPA related information may include local GW address(es) and APN for LIPA. The capability information of Home (e)NodeB may include LIPA_capability_indicator. Each of the information is as follows.

LIPA_capability_indicator: Indicate whether Home (e)NodeB supports a LIPA function.

Local GW address(es): Indicate an address, an identifier, or identification information within a network with respect to a local P-GW or local GGSN for supporting LIPA.

The CSG related information may include a CSG ID and a CSG access mode. The CSG access mode indicates in which access mode the Home (e)NodeB 300 is operated among a closed access mode, an open access mode, and a hybrid access mode.

On the other hand, the MME 510 (or SGSN in case of UMTS) determines whether to enable LIPA based on the received information. In other words, the MME 510 (or SGSN in case of UMTS) may check whether LIPA is supported at the Home (e)NodeB based on the APN, or check whether LIPA is supported at the Home (e)NodeB based on the LIPA_capability_indicator. At this time, the MME 510 (or SGSN in case of UMTS) may determine by further considering at least one of the subscriber information and the operator policy of the UE in addition to the received information. Furthermore, the MME 510 (or SGSN in case of UMTS) may determine by further considering CSG information.

The MME 510 transmits a response message including a LIPA available message or indicator indicating that LIPA is available and APN for LIPA based on the determination. The indicator may be a LIPA_Available_indicator. The LIPA_Available_indicator is used to inform the UE of that the LIPA function is available at Home (e)NodeB. Furthermore, the MME 510 may store a result of the determination and the received information within a MM/EPS Bearer context for each UE context or UE.

The LIPA_capability_indicator may be transferred together with CSG information or independently from the CSG information. When transferred together with the CSG information denotes that LIPA is available when Home (e)NodeB has a CSG membership. At this time, even though the LIPA is available, the available period may be determined according to the CSG membership, and it cannot be used if the available period has been expired. On the other hand, a case where it is transferred independently from the CSG information denotes that LIPA is available even without having a CSG membership. In other words, if the Home (e)NodeB 300 is operated in a hybrid access mode or operated in an open access mode, then the UE 100 may use a LIPA function even without having a CSG membership. In this manner, a scheme of transferring the LIPA_capability_indicator together with CSG information and a scheme of transferring independently from CSG information may be suitably combined with each other.

As described above, whether LIPA is available to the UE 100 may be notified when attached (or accessed), or RAU or TAU is carried out. However, whether LIPA is available may be notified even when RAU or TAU is carried out.

On the other hand, up to this point, it has been described such a case where the MME 510 determines whether LIPA is available to transfer LIPA_capability_indicator to the UE 100 when the UE 100 performs attach, TAU or RAU. However, there exist several cells in a RAI or TAI list which is a unit of RAU/TAU, and the UE 100 being operated in an idle mode may camp on several cells belong to the TAI or RAI list. Accordingly, if the UE 100 performs attach, TAU, or RAU to a specific cell for the MME 510 not to make a repetitive determination, then the MME 510 may determine with respect to several cells belonging to the TAI or RAI list at a time, and transfer an additional list for LIPA available cells to the UE 100. Instead of an additional list for LIPA available cells, the MME 510 may allow LIPA_capability_indicator to be included in the TAI list to be transferred.

On the other hand, the UE 100 may check whether LIPA is available by using the predefined APN and the LIPA available message or indicator (for instance, LIPA_Available_indicator), and the UE 100 may request bearer setup for the LIPA to an entity within the core network, for instance, MME 510 or SGSN, through the Home (e)NodeB 300 only if the LIPA is available. At this time, control for bearer setup is carried out at the MME 510, and the setup request is transferred to the MME 510. However, an actual session (PDN connection or bearer) is created by passing through the local network 800 and the Home (e)NodeB 300. In other words, the control (control plane) to a bearer setup request for using the local network is carried out by the communication network, and an actual bearer (user plane) is created between nodes within the local network by passing through the Home (e)NodeB.

As described above, the UE 100 checks whether LIPA is available at the Home (e)NodeB 300 through a LIPA available message or indicator, for instance, LIPA_Available_indicator, and bearer setup is requested only when the LIPA is available, and thus a bearer setup request of the UE 100 is not failed. Accordingly, it has an advantage that unnecessary signaling is not made. In addition, it may be possible to prevent radio resources from being wasted.

Hereinafter, it will be described as follows with reference to FIGS. 6 and 7.

Figure 6:
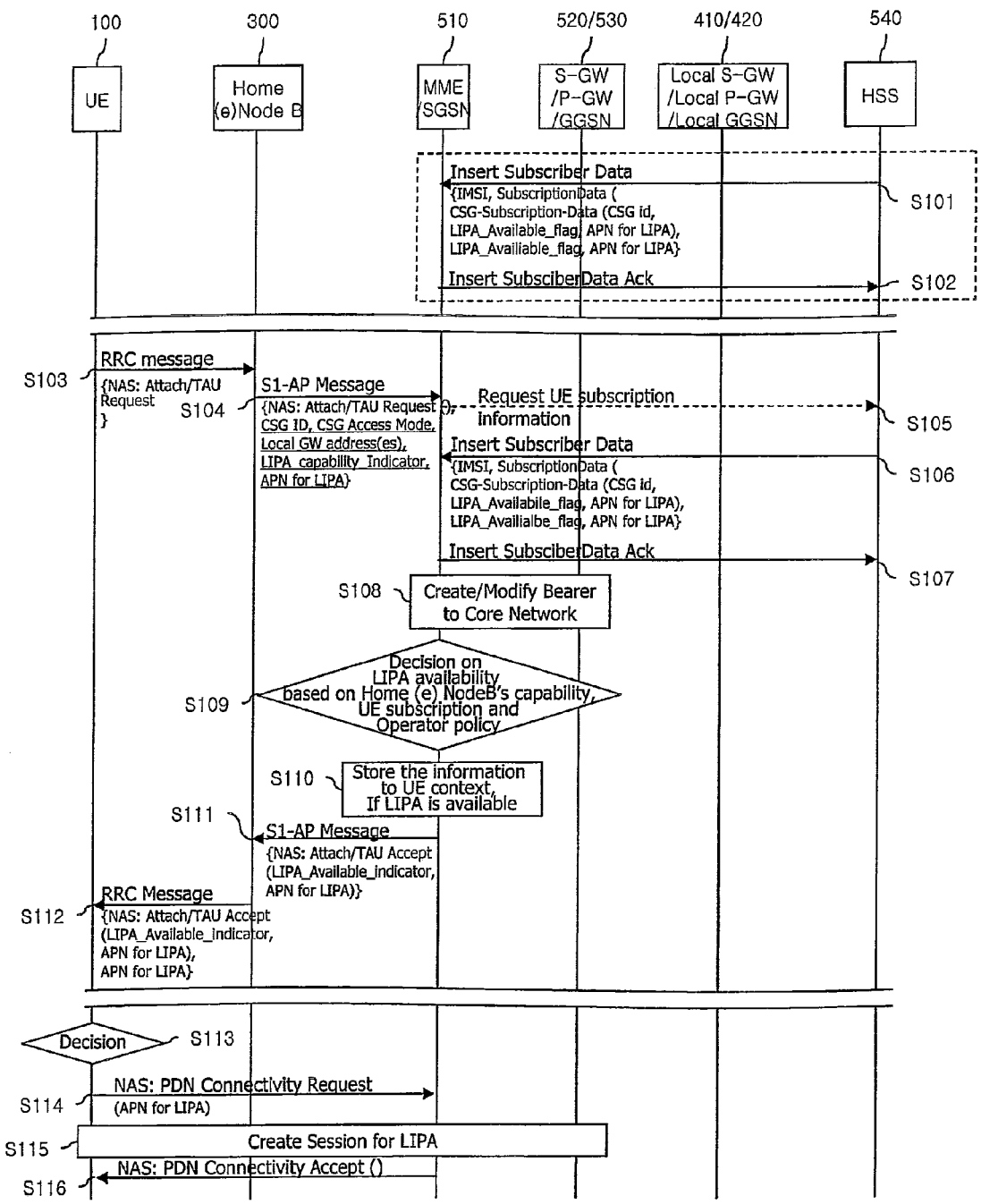
FIG. 6 is a flow chart illustrating a control procedure of LIPA according to the present invention.

FIG. 6 is a flow chart illustrating a control procedure of LIPA according to the present invention. FIG. 7 is an exemplary view illustrating the protocol of a message illustrated in FIG. 6.

First, prior to specifically describing each procedure with reference to

FIG. 6, messages illustrated in FIG. 6 will be briefly described as follows with reference to FIG. 7.

The messages transmitted or received between the UE 100 and the Home (e)NodeB 300 are based on the Radio Resource Control (RRC) protocol. The messages transmitted or received between the Home (e)NodeB 300 and the MME 510 or SGSN (not shown) are based the S1 Application Protocol (S1-AP).

The messages transmitted or received between the UE 100 and the MME 510 or SGSN (not shown) are based on the Non-Access Stratum (NAS) protocol. The messages based on the NAS protocol are encapsulated in a message based on the RRC protocol and the S1-AP message, respectively, and then transmitted. Hereinafter, each procedure will be described in detail with reference to FIG. 6.

1) First, it is assumed that the MME 510 (or SGSN) has subscriber information for the UE 100 by acquiring it from the HSS 540 (or HLR). At this time, if subscriber information for the UE 100 is updated, then the HSS 540 transmits a subscriber information message, for instance, Insert Subscriber Data message, including the updated subscriber information to the MME 510 (S101). The subscriber information message may include IMSI (International Mobile Subscriber Identity) and subscriber information, for instance, Subscription Data. The subscriber information (Subscription Data) may include CSG subscriber information (CSG-Subscription-Data). The CSG subscriber information may include a CSG ID and a LIPA subscription or non-subscription indicator. The LIPA subscription or non-subscription indicator indicates whether or not the UE 100 is subscribed to a LIPA service. The LIPA subscription or non-subscription indicator may be a LIPA_Available_flag.

TABLE 1

Insert Subscriber Data
{
IMSI, SubscriptionData(
CSG-Subscription-Data (CSG ID, LIPA_Available_flag, APN for LIPA)
}

It is illustrated in Table 1 that the CSG subscriber information includes a CSG ID and a LIPA subscription or non-subscription indicator. It means that the UE is subscribed to a LIPA service within a cell having a specific CSI ID.

Alternatively, the subscriber information message may include a LIPA subscription or non-subscription indicator and APN for LIPA as illustrated in Table 2.

TABLE 2

Insert Subscriber Data
{
IMSI, SubscriptionData(LIPA_Available_flag, APN for LIPA),
CSG-Subscirption-Data ( )
}

As illustrated in Table 2, if the subscriber information message directly includes a LIPA subscription or non-subscription indicator, then it means that the UE is subscribed to a LIPA service in all cells.

On the other hand, as illustrated in Tables 1 and 2, the APN information for LIPA is transferred to the UE 100 when the UE 100 accesses the relevant CSG cell or Home (e)NodeB 300.

The MME 510 (or SGSN) transmits a response message, for instance, Insert Subscriber Data Ack message, to the HSS 540 (or HLR) in response to the subscriber information message (S102).

2) On the other hand, the UE 100 generates an access request message, i.e., attach request message (or TAU request message or RAU request message) to request attach (access or TAU/RAU) to the core network, and encapsulates the generated attach request message in a RRC protocol-based message, and transmits the encapsulated message with the RRC protocol to the Home (e)NodeB 300 (S103).

Upon receiving the RRC message from the UE 100, the Home (e)NodeB 300 extracts the access request message, i.e., attach request message, included in the RRC message. Then, information related to the Home (e)NodeB 300 and CSG related information are included in an initial message together with the extracted message, and then transmitted to the MME 510 (S104). The initial message is based on S1-AP. The initial message may be, for instance, an Initial UE message.

The information related to the Home (e)NodeB 300 may include LIPA related information and capability information of Home (e)NodeB. The LIPA related information may include at least one of local GW address(es) and APN for LIPA. Here, the local GW address(es) denote local GW address(es) for LIPA and the APN for LIPA is transferred to the UE to be used as a parameter to be transferred when LIPA PDN is requested. The capability information of Home (e)NodeB may include LIPA_capability_indicator. Here, the capability information of Home (e)NodeB indicates what type of services are provided in a region covered by the Home (e)NodeB. In other words, it is used to distinguish each service when several services in addition to LIPA are used at the Home (e)NodeB. If only LIPA is used at the Home (e)NodeB, then it may be replaced by the local GW address(es).

The CSG related information may include a CSG ID and a CSG access mode. The CSG ID is used to grasp current CSG subscription information. The CSG access mode indicates in which access mode the Home (e)NodeB 300 is operated among a closed access mode, an open access mode, and a hybrid access mode. For example, if the UE is set such that LIPA is available in all cells and the Home (e)NodeB 300 is being operated in a hybrid access mode or open access mode, then the UE may use a LIPA service through the Home (e)NodeB 300.

The LIPA related information, capability information of the Home (e)NodeB, and the CSG related information as described above are independent to one another, and may be included in the initial message with a suitable combination of two or more.

3) The MME 510 transmits a UE subscriber information request message to the HSS 540 (or HLR) to acquire the subscriber information if it does not have the subscriber information of the UE 100 in advance as described above (S105).

The HSS 540 (or HLR) transmits a subscriber information message, for instance, Insert Subscriber Data message, to the MME 510 (S106). The subscriber information message may be configured as illustrated in the above Tables 1 and 2. The MME 510 transmits a response message to the HSS 540 in response to the subscriber information message (S107).

4) Then, the MME 510 creates/modifies a session with respect to the attach request (TAU request, RAU request, or handover request) (S108).

5) Subsequently, the MME 510 determines whether the UE 100 can use LIPA at the Home (e)NodeB 300 based on at least one of the received information, i.e., the LIPA related information, the capability information of the Home (e)NodeB, the CSG related information, and the subscriber information of the UE (S109). In other words, in case of the LIPA related information and the capability information of the Home (e)NodeB, the MME 510 (or SGSN in case of UMTS) may check whether LIPA is supported at the Home (e)NodeB based on the local GW address(es) or APN, or check whether LIPA is supported at the Home (e)NodeB 300 based on LIPA_capability_indicator. At this time, the MME 510 (or SGSN in case of UMTS) may determine by further considering operator policy in addition to the received information.

On the other hand, if it is determined whether LIPA is supported at the Home (e)NodeB, then the MME 510 (or SGSN in case of UMTS) may determine whether the UE 100 can use LIPA by considering the subscriber information of the UE and the CSG related information of the Home (e)NodeB 300. Here, the LIPA allowance range in the subscriber information of the UE may be applicable in various units such as CSG or entire cell, or the like.

TABLE 3

| LIPA Support of Home(e)NodeB | LIPA Subscription of UE | Access Mode of Home(e)NodeB | LIPA Availability of UE at Home(e)NodeB |
|---|---|---|---|
| Supported | Subscribed | Closed access mode | Available (Accessed in CSG mode) |
| Supported | Non-subscribed | Closed access mode | Non-available |
| Supported | Subscribed | Hybrid/open access mode | Available (Accessed in CSG mode) |
| Supported | Non-subscribed | Hybrid/open access mode | Non-available |

As described above, subsequent to the determination, the MME 510 stores a result of the determination in a MM/EPS bearer context for each UE context or UE (S110). Then, the stored result may be used as a basis of determining session setup when the UE 100 requests LIPA PDN connectivity. In other words, the same determination process will not be repeated.

6) Subsequently, the MME 510 generates an attach accept message (or TAU accept message, or RAU accept message, or handover accept message) in response to the attach request. The attach accept message may include a LIPA available message or indicator indicating that LIPA is available. The LIPA available message or indicator may be LIPA_Available_indicator. The LIPA_Available_indicator may be used to inform the UE of that a LIPA function is available at the Home (e)NodeB. The attach accept message may further include APN for LIPA. The APN for LIPA may be transferred from the Home (e)NodeB or may be transferred from the subscriber information.

Then, the MME 510 encapsulates the generated attach accept message in an initial setup message, for instance, Initial Context Setup, and transmits it to the Home (e)NodeB 300 (S111). The initial setup message, for instance, Initial Context Setup, may be based on the S1-AP protocol.

7) Upon receiving the initial setup message, the Home (e)NodeB 300 extracts the attach accept message. Then, the Home (e)NodeB 300 encapsulates the extracted attach accept message with a RRC protocol and transmits it to the UE 100 (S112). The message encapsulated with the RRC protocol may further include APN for LIPA. If all Home (e)NodeBs use the same APN within an operator's network, then the APN for LIPA included in the message encapsulated in the RRC protocol may be used to inform the fact.

On the other hand, the message encapsulated with the RRC protocol may further include a CSG ID. It may be possible when information on whether the CSG id and Local IP access can be supported in the UE 100 has been transferred in advance through OTA or other methods.

8) Upon receiving the message encapsulated with the RRC protocol, the UE 100 extracts the attach accept message and checks a LIPA available message or indicator indicating whether LIPA is available in the attach accept message and APN for LIPA. Then, the UE 100 may determine whether the Home (e)NodeB 300 can use a LIPA service for itself using the LIPA available message or indicator and the APN for LIPA (S113).

In this manner, the UE 100 does not request a LIPA service when it is located within a cell in which the LIPA is unavailable and thus control signals are unnecessarily not transmitted or received, thereby reducing the load of the network and the MME 510. In other words, the UE 100 may determine whether to attempt in a current cell when receiving an indicator for the current cell. When moved to another cell, the UE 100 may attempt depending on LIPA available information broadcast in each cell. It may be attempted but then rejected since the subscriber information is not considered, but it may be possible to reduce the waste of control signals through minimal checking.

If a list of LIPA available cells within a region corresponding to the RAI or TAI list is received, then the UE may determine whether to attempt based on the information.

On the other hand, when the LIPA service is available, the UE 100 transmits a PDN Connectivity Request message to the MME 510 through the Home (e)NodeB (S114). The PDN Connectivity Request message may include the APN for LIPA.

According to the request, a session for LIPA is created (S115), and the MME 510 transmits a PDN Connectivity Accept message to the UE 100 through the Home (e)NodeB (S116). Here, the processes S114 through S116 are illustrated in detail in FIG. 8.

On the other hand, in the forgoing process S104, it has been described that the initial message includes the LIPA related information, the capability information of the Home (e)NodeB, and the CSG related information. Alternatively, however, it may be also possible that identity information (for instance, delimiter within a network such as id, address, or the like) is stored in the DB of an entity of the core network, or stored in DNS, and retrieved by the MME 510 (SGSN) when required, thereby using the LIPA related information, the capability information of the Home (e)NodeB, and the CSG related information.

Figure 8:
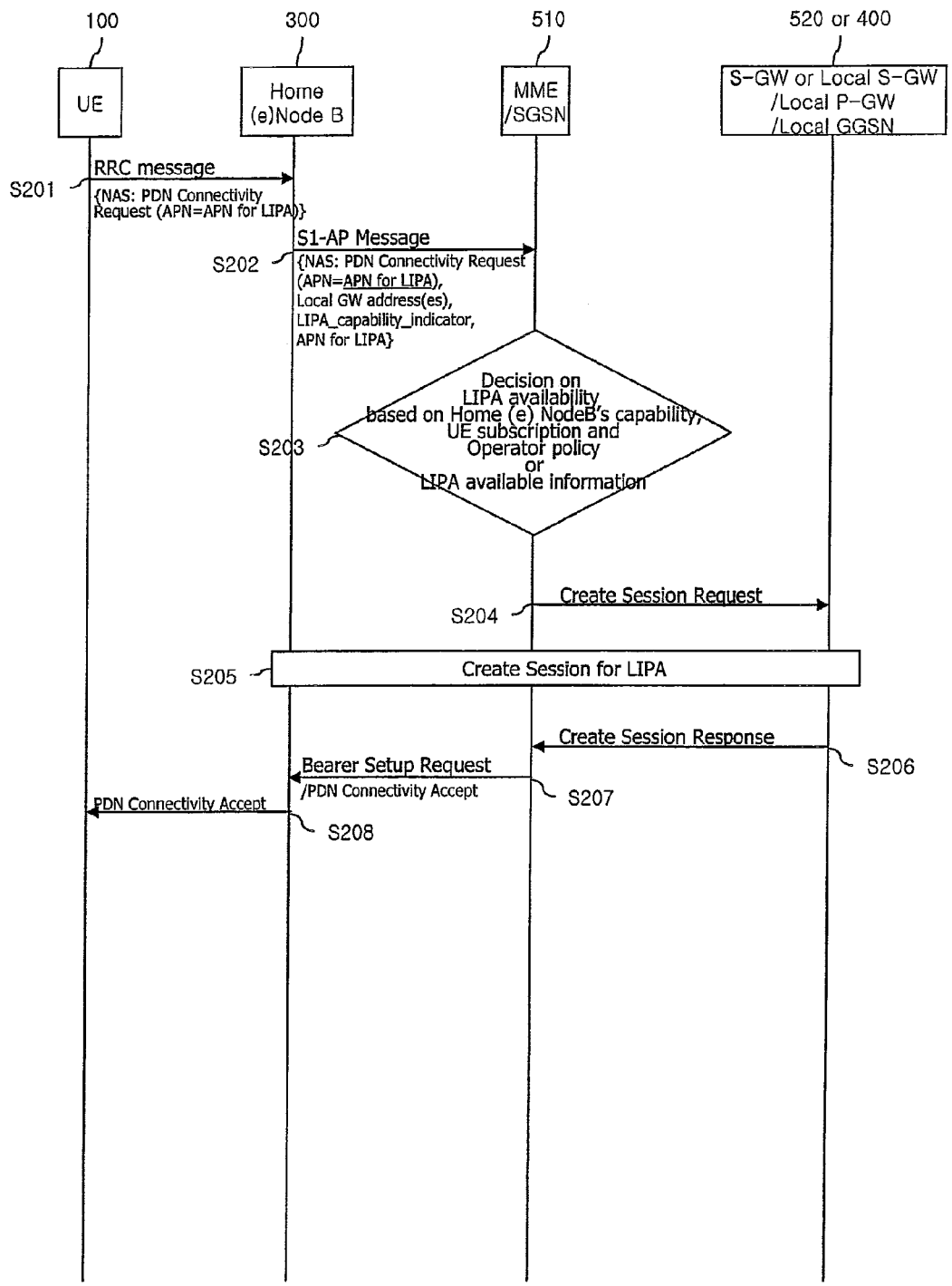
FIG. 8 is a flow chart illustrating the process of configuring LIPA connection according to the present invention.

FIG. 8 is a flow chart illustrating the process of configuring LIPA connection according to the present invention.

It will be described as follows with reference to FIG. 8.

1) The UE 100 encapsulates a connectivity request message, for instance, PDN Connectivity Request message based on NAS, according to the RRC protocol to use a LIPA service through the Home (e)NodeB 300 to transmit to the Home (e)NodeB 300 (S201). The connectivity request message, for instance, PDN Connectivity Request message based on NAS, may include APN for LIPA. Otherwise, in case of the APN for LIPA, different names may be used for each cell, and many names will be used, thereby causing difficulty in management. Accordingly, an indicator indicating that LIPA is available in a current cell may be transferred instead of the APN for LIPA.

2) Then, the Home (e)NodeB 300 extracts the connectivity request message from the message encapsulated with the RRC protocol. Then, the Home (e)NodeB related information is included in an S1-AP-based message together with the extracted connectivity request message and transmitted to the MME 510 (S202). The information related to Home (e)NodeB 300 may include LIPA related information and capability information of Home (e)NodeB. The LIPA related information may include local GW address(es) and APN for LIPA. The capability information of Home (e)NodeB may include a local gateway address and LIPA_capability_indicator.

3) Upon receiving the PDN Connectivity Request message, the MME 510 determines whether to configure the PDN connection (S203). At the time of the determination, information stored in the process S110 of FIG. 6 may be used, or information within the PDN Connectivity Request message may be used. Otherwise, the determination may be performed once more as in the process S109 of FIG. 6. In case where the information within the PDN Connectivity Request message is used at the time of the determination, for example, the MME 510 may check whether APN included in the PDN Connectivity Request message is for LIPA, and the MME 510 may check whether an indicator indicating the connection of LIPA is included therein. On the other hand, the MME 510 may check the subscriber information of the UE to determine whether to provide a LIPA function.

4) If it is determined to configure the PDN connection, then the MME 510 transmits a session creation request message, for instance, Create Session Request message, to S-GW, local S-GW, local P-GW, or local GGSN (S204). The session creation request message may include information required when configuring a session at the Home (e)NodeB, such as an address of the local S-GW, local P-GW, and local GGSN.

5) According to the session creation request message, a session is created between the Home (e)NodeB and the S-GW, local S-GW, local P-GW, or local GGSN (S205), and an IP address to be used by the UE 100 in a local network at home or in company is allocated.

6) The S-GW, local S-GW, local P-GW, or local GGSN transmits a session creation response message, for instance, Create Session Response message, to the MME 510 (or SGSN) (S206). The session creation response message may include an IP address to be used by the UE in the local network. Furthermore, the session creation response message may include the address and TEID of the local gateway for allowing the Home (e)NodeB 300 to configure a session in the local network. In other words, it may include the address and TEID of the local serving gateway 420 in case of applying the structure of FIG. 4, and may include the address and TEID of the local PDN gateway 410 in case of applying the structure of FIG. 5.

7) The MME 510 (or SGSN) transfers a PDN connectivity accept message, for instance, PDN Connectivity Accept message, to the Home (e)NodeB 300 (S207). The PDN Connectivity Accept message may include an address of the local serving gateway 420 or local PDN gateway 410 and the TEID thereof, and the Home (e)NodeB 300 forms a session using that.

8) The Home (e)NodeB 300 transfers the PDN connectivity accept message, for instance, PDN Connectivity Accept message, to the UE 100.

Figure 7:
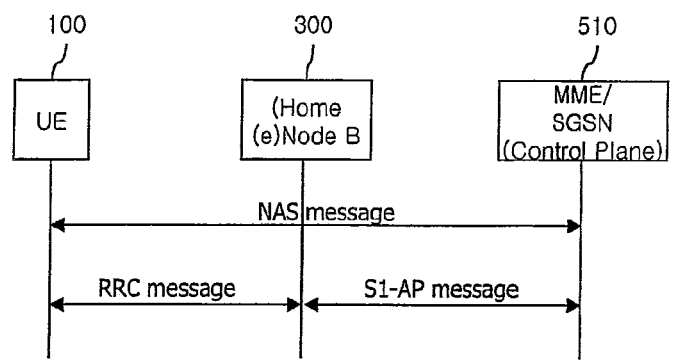
FIG. 7 is an exemplary view illustrating the protocol of a message illustrated in FIG. 6.

Up to now, referring to FIGS. 6 through 8, it has been described a case where the UE 100 requests attach to the MME 510, and a case where the UE 100 requests TAU/RAU to the MME 510. However, the present invention is not limited to this, but it may be also applicable to a case where the UE performs cell reselection.

As described up to this point, a method according to the present invention can be realized by software, hardware, or their combination. For example, a method according to the present invention may be stored in a storage medium (e.g., internal terminal, flash memory, hard disk, etc.), and may be realized by codes or commands within a software program that is executable by a processor, such as microprocessor, controller, microcontroller, application specific integrated circuit (ASIC). It will be described with reference to FIG. 9.

Figure 9:
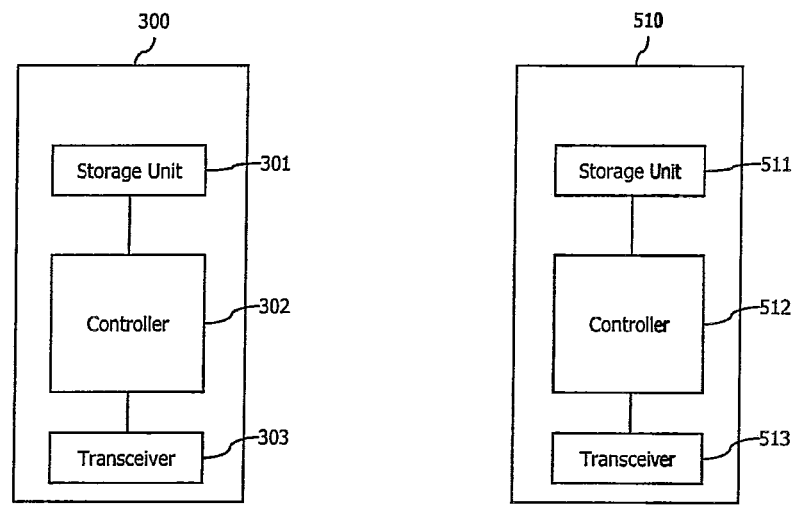
FIG. 9 is a configuration block diagram of Home (e)NodeB 300 and MME 510.

FIG. 9 is a configuration block diagram of Home (e)NodeB 300 and MME 510.

As illustrated in FIG. 9, the Home (e)NodeB 300 may include a storage unit 301, a controller 302, and a transceiver 303.

The MME 510 may include a storage unit 511, a controller 512, and a transceiver 513.

The storage units store a software program in which a method illustrated in FIGS. through 8 is realized.

Each of the controllers controls the storage units and the transceivers, respectively. Specifically, the controllers implement each of the foregoing methods stored in the storage units, respectively. Then, each of the controllers transmits the foregoing signals through the transceivers.

Though preferred embodiments of present invention are exemplarily described as disclosed above, the scope of the invention is not limited to those specific embodiments, and thus various modifications, variations, and improvements can be made to the present invention without departing from the spirit of the invention, and within the scope of the appended claims.

The invention claimed is:

1. A method of controlling a Local IP Access (LIPA) service in a core network entity taking charge of the control plane within a mobile communication network, the method comprising:

receiving an initial message from Home (e)NodeB, wherein the initial message comprises at least one of LIPA related information and capability information, and the LIPA related information comprises at least one of Access Point Name (APN) for LIPA and information for a local gateway, and the capability information comprises a first indicator indicating whether the Home (e)NodeB supports a LIPA function, and the initial message comprises an attachment request message by a terminal;

determining whether the terminal uses a LIPA service at the Home (e)NodeB by considering at least one of the LIPA related information within the initial message, the capability information within the initial message, and subscriber information of the terminal, upon receiving the initial message;

storing a result of the determination;

generating an attachment accept message comprising a second indicator indicating whether the terminal uses a LIPA service at the Home (e)NodeB;

transmitting an initial setup message comprising the generated attachment accept message to the Home (e)NodeB for transmission to the terminal; and receiving, from the terminal via the Home (e)NodeB, a request related to bearer setup for LIPA only when the second indicator indicates that the terminal uses the LIPA service at the Home (e)NodeB.

2. The method of claim 1, wherein the initial message is an Initial User Equipment (UE) message, or an UPLINK NAS TRANSPORT message based on S1-AP, and the access request message is any one of an attach request message, a Tracking Area Update (TAU) request message, a Routing Area Update (RAU) request message, and a handover request message.

3. The method of claim 1, wherein the access accept message is any one of an Attach Accept message, a Tracking Area Update (TAU) Accept message, and a Routing Area Update (RAU) Accept message, and the initial setup message is an S1-AP-based message, an Initial context Setup message, or a UE Context Modification message.

4. The method of claim 1, wherein the initial message further comprises Closed Subscriber Group (CSG) related information.

5. The method of claim 4, wherein the CSG related information further comprises at least one of a CSG ID and a CSG access mode parameter of the Home (e)NodeB.

6. The method of claim 1, wherein the indicator indicating whether the Home (e)NodeB supports a LIPA function is LIPA_capability_indicator, and
the indicator indicating whether the terminal can use a LIPA service at the Home (e)NodeB is LIPA_Available_indicator.

7. The method of claim 1, wherein in the determination step it is further considered whether the terminal is subscribed to a LIPA service based on the subscriber information.

8. The method of claim 1, wherein in the determination step it is further considered whether the terminal has a Closed Subscriber Group (CSG) membership to the Home (e)NodeB.

9. The method of claim 1, wherein in the storing step
the result of the determination is stored within a UE context or a Mobility Management/Evolved Packet Core (MM/EPC) Bearer Context.

10. The method of claim 1, wherein the access accept message further comprises APN for a LIPA service.

11. A core network entity of taking charge of a Local IP Access (LIPA) service within a mobile communication network, the core network entity comprising:
a receiver configured to receive an initial message comprising LIPA related information and capability information from Home (e)NodeB, wherein the LIPA related information comprises at least one of Access Point Name (APN) for LIPA and information for a local gateway, and the capability information comprises a first indicator indicating whether the Home (e)NodeB supports a LIPA function, and the initial message comprises an attachment request message by a terminal;
a controller configured to control to determine whether the terminal uses a LIPA service at the Home (e)NodeB by considering at least one of the LIPA related information within the initial message, the capability information within the initial message, and subscriber information of the terminal, in response to the initial message, and store a result of the determination; and
a transmitter configured to encapsulate an attachment accept message comprising a second indicator indicating whether the terminal uses a LIPA service at the Home (e)NodeB in an initial setup message to transmit to the Home (e)NodeB for transmission to the terminal,
wherein the receiver is further configured to receive, from the terminal via the Home (e)NodeB, a request related to bearer setup for LIPA only when the second indicator indicates that the terminal uses the LIPA server at the Home (e)NodeB.

12. The server of claim 11, wherein the initial message is an Initial User Equipment (UE) message based on S1-AP, and
the access request message is any one of an attach request message, a Tracking Area Update (TAU) request message, a Routing Area Update (RAU) request message, and a handover request message.

13. The server of claim 11, wherein the initial message further comprises Closed Subscriber Group (CSG) related information, and the CSG related information further comprises at least one of a CSG ID and a CSG access mode parameter of the Home (e)NodeB.

14. The server of claim 11, wherein the access accept message is any one of an Attach Accept message, a Tracking Area Update (TAU) Accept message, and a Routing Area Update (RAU) Accept message, and
the initial setup message is an Initial context Setup message.

15. The server of claim 11, wherein the indicator indicating whether the Home (e)NodeB supports a LIPA function is LIPA_capability_indicator, and
the indicator indicating whether the terminal can use a LIPA service at the Home (e)NodeB is LIPA_Available_indicator.

16. The server of claim 11, wherein the controller performs the determination by further considering whether the terminal a Closed Subscriber Group (CSG) membership to the Home (e)NodeB.

* * * * *